United States Patent [19]

Procter et al.

[11] Patent Number: 4,896,000
[45] Date of Patent: Jan. 23, 1990

[54] ARRANGEMENT FOR TERMINATING AN ELECTRICAL CABLE SCREEN

[75] Inventors: Brian T. Procter, Stroud; Derek R. Chambers, Swindon, both of England

[73] Assignee: Raychem Limited, England

[21] Appl. No.: 251,598

[22] Filed: Sep. 30, 1988

[30] Foreign Application Priority Data

Oct. 2, 1987 [GB] United Kingdom ............... 8723213

[51] Int. Cl.⁴ .............................................. H02G 15/02
[52] U.S. Cl. ................................ 174/74 R; 174/35 C; 174/75 C; 174/89; 174/DIG. 8
[58] Field of Search ................... 174/350, 65 R, 74 R, 174/75 R, 75 C, 76, 89, DIG. 8; 439/578, 579, 580, 581, 582, 583, 584, 585, 932

[56] References Cited

U.S. PATENT DOCUMENTS

| | | | |
|---|---|---|---|
| 2,027,962 | 1/1936 | Currie | 264/230 |
| 3,142,721 | 7/1964 | Long | 174/75 C |
| 3,439,294 | 7/1969 | Franagan et al. | 174/89 |
| 3,990,765 | 11/1976 | Hill | 439/580 X |
| 4,181,775 | 1/1980 | Corke | 174/DIG. 8 X |
| 4,415,223 | 11/1983 | Asick | 174/89 X |
| 4,786,757 | 11/1988 | Owensby et al. | 174/35 C |

FOREIGN PATENT DOCUMENTS

| | | |
|---|---|---|
| 94849A | 11/1983 | European Pat. Off. . |
| 110519A | 6/1984 | European Pat. Off. . |
| 191673A | 8/1986 | European Pat. Off. . |
| 238203A | 2/1987 | European Pat. Off. . |
| 1007859 | 10/1965 | United Kingdom ............... 174/35 C |
| 1557710 | 12/1979 | United Kingdom . |
| 2104800 | 3/1983 | United Kingdom . |
| 2128040A | 4/1984 | United Kingdom . |
| 2182212A | 5/1987 | United Kingdom . |

Primary Examiner—Morris H. Nimmo
Attorney, Agent, or Firm—Simon J. Belcher; Herbert G. Burkard

[57] ABSTRACT

An arrangement for termination of a screened cable comprises:
 (a) a termination piece for the screen having a hollow, preferably metal, cable entry portion that can be positioned around the wire(s) of the cable, and
 (b) a dimensionally recoverable hollow article which can be positioned over at least part of the cable entry portion and the proximal part of the cable extending from the cable entry portion.

The cable entry portion is provided with a gripping member, for example a thin annular ridge, for gripping the cable screen, placed around the entry portion. After the cable screen has been positioned over the cable entry portion and gripping member, the recoverable article is positioned over the cable and cable entry portion and is recovered to cause the gripping member to grip the cable screen.

11 Claims, 2 Drawing Sheets

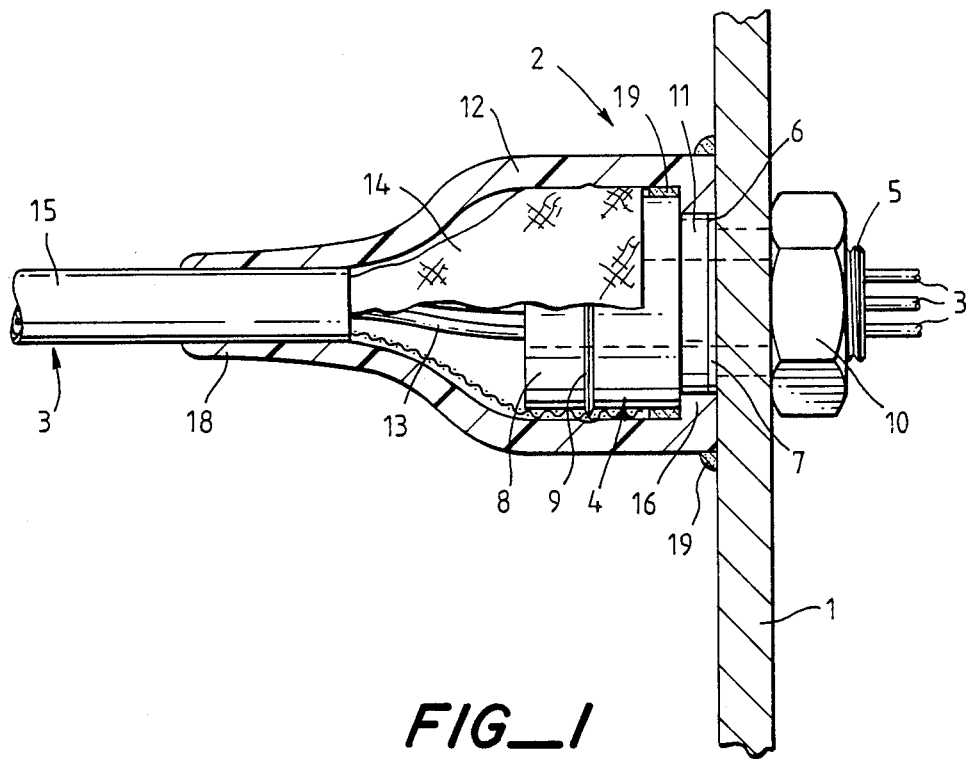
FIG_1

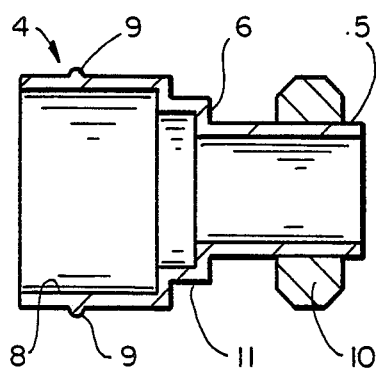
FIG_2
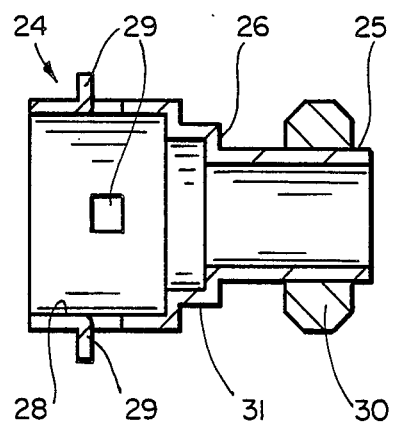
FIG_3

ARRANGEMENT FOR TERMINATING AN ELECTRICAL CABLE SCREEN

This invention relates to arrangements for terminating the screen of an electrical cable, for example for terminating cable screens in electrical connectors or in cable feedthroughs. Such connectors and feedthroughs may be used in both military and commercial applications, in ground installations and in land, air or marine craft.

According to one aspect, the invention provides an arrangement for terminating the screen of a cable having one or more electrical wires and an electrical screen, which comprises:

(a) a termination piece for the screen which has a hollow, electrically conductive, cable entry portion that can be positioned around the wire or wires of the cable, the cable entry portion having an outer surface that can be positioned inside part of the cable screen and the outer surface of the cable entry portion being provided with a gripping member for the cable screen; and (b) a dimensionally recoverable hollow article which can be positioned over at least the cable entry portion and the proximal part of a cable extending therefrom, and which can be dimensionally recovered onto the cable entry portion and cable so as to retain the cable shield against the gripping member.

According to another aspect, the invention provides an arrangement which comprises:

(a) an electrical cable having one or more electrical wires and an electrical screen;

(b) a termination piece for the screen which has a hollow, electrically conductive cable entry portion into which the wire or wires of the cable extend, the cable entry portion having an outer surface over which part of the cable screen has been positioned, and the outer surface of the cable entry portion having a gripping member for the cable screen; and (c) a hollow article which is located over at least part of the cable entry portion and the proximal part of the cable and has been dimensionally recovered onto the cable entry portion and cable so that the article retains the cable shield against the gripping member.

The arrangement according to the invention has the advantage that it enables cable screens to be terminated, for example when cables are passed through a feedthrough in a partition, in a particularly simple and economical manner. The arrangement obviates the necessity of any additional separate metallic attachment parts for connecting the cable shield to the termination piece by relying on the recovered dimensionally recoverable article to retain the screen against the gripping member of the termination piece.

The termination piece may be formed in a number of ways. For example it may be formed by casting or machining a block of metal, in which case the gripping member may be formed as a surface profile on the cable entry portion, for example one or more annular rings. Alternatively the termination piece may be formed from sheet metal by any appropriate conventional forming process, in which case the gripping member may be in the form of a plurality of lugs or tongues that are located around the circumference of the cable entry portion, for example formed by a stamping operation.

As stated above, the hollow article that encloses the cable entry portion is dimensionally recoverable, that is to say, it has a dimensional configuration that may be made substantially to change when subjected to the appropriate treatment. Preferably the article is dimensionally heat-recoverable whose configuration may be made to change on heating.

In their most common form, heat recoverable articles comprise a heat-shrinkable sleeve (which may be tubular or wraparound) made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

Preferably the recoverable article is expanded only slightly so that, although it is possible to slide the article over the cable entry portion, it will be loosely held in position before it is recovered. For example the article may be a moulded article having an internal lip that engages a corresponding groove in the termination piece to hold the article in place before recovery, and to provide sufficient pull-off resistance after recovery. In the case of moulded articles, the article may have an inner surface that is profiled to cooperate with the gripping member to grip the cable screen.

The article may be formed from any material that may be rendered dimensionally heat-recoverable, for example olefin homo- and copolymers e.g. high, medium or low density polyethylene, ethylene vinyl acetate polymers, polyamides, fluorinated polymers such as polyvinylidine fluoride, and the like.

In additon, the recoverable article is preferably provided internally with one or more areas of sealant in order to produce an environmental seal between the connector or the partition in the case of a feedthrough, and the cable. In the case of heat-shrinkable articles hot-melt adhesives are preferred as sealants since they exhibit good adhesive and sealing properties and may be activated when the article is heated to recover it. Examples of hot-melt adhesives that may be used include those based on polyolefins e.g. polyethylene or ethylene/vinyl acetate or ethylene ethyl acrylate copolymers, or polyamides, especially those polyamides based on dimer acids and/or dimer diamines, as described, curable adhesives e.g. epoxy adhesives may be used, for example as described in British Patent Application No. 2,104,800A. The sealant may be provided over the entire interior surface of the recoverable article or it may be provided in the end regions only in order to provide a bond to the cable jacket and to the cable termination piece.

In most instances cables having braided screens may be used directly with the arrangement according to the invention, the braid simply being radially expanded and pushed over the cable entry portion. In other cases, however, for example where the cable screen is or includes a metal tape wrap, it may be difficult to expand the braid radially over the cable entry portion, and so it may be appropriate for the termination piece to include a pre-installed length of cable shield that can be connected to the existing shield of the cable. For example the recoverable article and length of additional cable shield may be pre-installed so that it can simply be mounted in the partition aperture and the cable, after stripping an appropriate part of the cable jacket, can be inserted into the feedthrough before the article is heated to recover it about the cable. In this instance either a conductive adhesive, e.g. a silver flake loaded hot-melt adhesive can be used in the region of the connection between the cable shields, or a simple unfilled hot-melt adhesive, the recovery forces of the heat recoverable article forcing the two braids together.

Embodiments of the invention will now be described by way of example with reference to the accompanying drawings, in which: FIG. 1 is a side elevation, partly in section, of the arrangement of the invention; FIG. 2 is a longitudinal cross-section through the feedthrough of the arrangement shown in FIG. 1; and FIG. 3 is a longitudinal cross-section through another embodiment of feedthrough.

Referring to the accompanying drawings, FIG. 1 shows a bulkhead 1 having an aperture in which a feedthrough arrangement 2 and cable 3 extend. The feedthrough arrangement comprises a generally tubular hollow metal feedthrough 4 having a screw threaded portion 5 ending in a shoulder 6 which is optionally provided with an electromagnetic interference shielding gasket 7. The feedthrough is shown in more detail in FIG. 2. The feedthrough ends in a cable entry portion 8 having an outer surface that has an annular rib 9 extending around its periphery. The cable entry portion 8 and the shoulder 6 are speparated by a small intermediate region 11 of slightly smaller diameter than that of the cable entry portion 8. A nut 10 is located on the screw threaded portion 5 on the opposite side of the bulkhead to the shoulder 6 and gasket 7 and has been tightened sufficiently to ensure a good electrical contact between the feedthrough and the bulkhead 1.

The electrical cable 3 has a number of electrical wires 13 that extend through the feedthrough arrangement, a braided electrical screen 14 which is terminated by the arrangement, and a cable jacket 15. The cable screen 14 has been axially contracted slightly to cause it to open out and increase in diameter, and the end of the braid has been pushed over the cable entry portion 8 of the feedthrough.

The arrangement includes a hollow, dimensionally heat-recoverable moulded article 12 having an internal lip 16 at one end. The article 12 was originally formed so that it could be slipped over the cable 3 before the cable was introduced into the feedthrough, and could then be pushed over the cable entry portion 8 and cable screen 14. The internal diameter of the article 12 was such that it was only just large enough to be pushed over the entry portion 8 and screen 14, and so that the lip 16 engaged the annular groove defined by the intermediate region 11, the bulkhead 1 and the end of the cable entry portion 8. When the heat-shrinkable article 12 is recovered for example by means of a hot-air gun, the article forces the cable screen 14 against the annular ridge 9 to cause it to grip the shield and provide a good electrical contact between the screen 14 and the feedthrough.

The heat shrinkable article is provided with a layer of hot-melt adhesive at the end 18 of the article to provide a seal between the article and the cable jacket 15. In addition a relatively large quantity of hot-melt adhesive 19 is provided at the other end of the heat-shrinkable article in the region of the lip 16. On recovery of the article 12 the adhesive is forced between the end of the heat shrinkable article and the bulkhead 1 to provide a seal.

If it is intended for the cable to be shielded on both sides of the bulkhead, a corresponding shield termination arrangement can be used on the other side of the bulkhead. In this case a cable entry portion having an internal screw thread would be screwed onto the portion 5 in place of the nut 10.

FIG. 3 shows a feedthrough 24 having a screw threaded portion 25 ending in a shoulder 26. The feedthrough ends in a cable entry portion 28 having an outer surface that has a plurality of upstanding lugs 29 that have been formed in the cable entry portion by stamping, The cable entry portion 28 and the shoulder 26 are separated by a small intermediate portion 31 of slightly smaller diameter than that of the cable entry portion 28. A nut 30 is located on the screw threaded portion 25.

We claim:

1. An arrangement for terminating the screen of a cable having one or more electrical wires and an electrical screen, which comprises:
   (a) a termination piece for the screen which has a hollow, electrically conductive, cable entry portion that can be positioned around the wire or wires of the cable, the cable entry portion having an outer surface that can be positioned inside part of the cable screen and the outer surface of the cable entry portion being provided with a gripping member for the cable screen, and
   (b) a dimensionally recoverable hollow article of a polymeric material which can be positioned over at least the cable entry portion and the proximal part of a cable extending therefrom, and which can be dimensionally recovered onto the cable entry portion and cable so as to retain the cable screen against the gripping member;
the termination piece and the hollow article having an annular lip and a cooperating groove which can engage one another when the article is dimensionally recovered, so as to inhibit removal of the article from the termination piece.

2. An arrangement which comprises:
   (a) an electrical cable having one or more electrical wires and an electrical screen,
   (b) a termination piece for the screen which has a hollow, electrically conductive cable entry portion into which the wire or wires of the cable extend, the cable entry portion having an outer surface over which part of the cable screen has been positioned, and the outer surface of the cable entry portion having a gripping member for the cable screen, and
   (c) a hollow polymeric article which is located over at least part of the cable entry portion and the proximal part of the cable and has been dimensionally recovered onto the cable entry portion and a cable so that the article retains the cable screen against the gripping member;

the termination piece and the hollow article having an annular lip and a cooperating groove which engage one another as a result of dimensionally recovery of the article so as to inhibit removal of the article from the termination piece.

3. An arrangement as claimed in claim 1, wherein the gripping member has been formed as a surface profile on the cable entry portion.

4. An arrangement as claimed in claim 3, wherein the gripping member comprises one or more annular ridges that extend around the circumference of the cable entry portion.

5. An arrangement as claimed in claim 2, wherein the gripping member has been formed as a surface profile on the cable entry portion.

6. An arrangement as claimed in claim 5, wherein the gripping member comprises one or more annular ridges that extend around the circumference of the cable entry portion.

7. An arrangement as claimed in claim 1, wherein the gripping member comprises a plurality of upstanding lugs that have been formed in the cable entry portion by stamping.

8. An arrangement as claimed in claim 1, wherein the hollow article has an inner surface that is profiled to cooperate with the gripping member to grip the cable screen.

9. An arrangement as claimed in claim 1, which includes a sealant for providing a seal between the hollow article and the termination piece for the screen.

10. An arrangement as claimed in claim 1, wherein the termination piece forms part of a feedthrough for allowing the cable to pass through an aperture in a partition.

11. An arrangement as claimed in claim 1, wherein the termination piece forms part of an electrical connector for the cable.

* * * * *